United States Patent
Ikeda et al.

(10) Patent No.: US 11,097,783 B2
(45) Date of Patent: Aug. 24, 2021

(54) FRONT PILLAR STRUCTURE

(71) Applicant: TOYOTA JIDOSHA KABUSHIKI KAISHA, Aichi-ken (JP)

(72) Inventors: Koki Ikeda, Toyota (JP); Shinya Kamimura, Toyota (JP); Kazuki Furukawa, Miyoshi (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 53 days.

(21) Appl. No.: 16/679,086

(22) Filed: Nov. 8, 2019

(65) Prior Publication Data
US 2020/0172169 A1    Jun. 4, 2020

(30) Foreign Application Priority Data
Dec. 4, 2018   (JP) .............................. JP2018-227710

(51) Int. Cl.
*B62D 25/04*    (2006.01)
*B62D 25/08*    (2006.01)
*B60R 13/02*    (2006.01)

(52) U.S. Cl.
CPC .............. *B62D 25/04* (2013.01); *B62D 25/08* (2013.01); *B60R 13/025* (2013.01)

(58) Field of Classification Search
CPC ........ B62D 25/04; B62D 25/08; B60R 13/025
USPC .................................................. 296/193.06
See application file for complete search history.

(56) References Cited

U.S. PATENT DOCUMENTS 7,434,870 B2 * 10/2008 Kinoshita ................ B60J 10/34
                                                          296/193.06

FOREIGN PATENT DOCUMENTS

| JP | 2003-276638 A | 10/2003 |
| JP | 2018-99988 A | 6/2018 |
| JP | 2018099988 A | * 6/2018 |

* cited by examiner

*Primary Examiner* — Joseph D. Pape
*Assistant Examiner* — Dana D Ivey
(74) *Attorney, Agent, or Firm* — Hauptman Ham, LLP (57) ABSTRACT

A front pillar structure is provided with a pillar frame component that forms part of a front pillar, and with a pillar garnish that forms part of the front pillar, and that has a surface covering portion that extends substantially in the vehicle vertical direction and covers the pillar frame component from the vehicle cabin inner side, and an elastic body that is joined to a wall surface facing the pillar frame component of the surface covering portion, and that firmly grips inside itself the vehicle cabin inner-side flange portions of the first component and the second component.

14 Claims, 5 Drawing Sheets

FRONT PILLAR STRUCTURE

CROSS-REFERENCE TO RELATED APPLICATION

This application is based on and claims priority under 35 USC 119 from Japanese Patent Application No. 2018-227710 filed on Dec. 4, 2018, the disclosure of which is incorporated by reference herein.

BACKGROUND

Technical Field

The present disclosure relates to a front pillar structure.

Related Art

A structure is known conventionally in which a front pillar is formed by a front-portion front pillar, a rear-portion front pillar, and sub-window glass, which is disposed between these, and a shock absorbing component (i.e., a pillar garnish) is attached via an embedded bolt portion to a front pillar main body (i.e., a frame component) forming part of the front-portion front pillar (see, for example, Japanese Unexamined Patent Application (JP-A) No. 2003-276638).

SUMMARY

However, in the above-described structure, a flat surface portion that is used for attaching the embedded bolt portion to the front pillar main body of the front-portion front pillar, namely, a flat surface portion that has a predetermined width and faces towards a vehicle occupant is required. In another words, a flat surface portion is required whose normal direction, when looked at in plan view, is substantially the same direction as the line of sight of a vehicle occupant who is viewing the front-portion front pillar from inside the vehicle cabin. Accordingly, this structure has the disadvantage that any further slenderization of the front-portion front pillar is impeded by the flat surface portion.

Therefore, it is an object of the present disclosure to provide a front pillar structure that enables a front pillar to be made more slender.

In order to achieve the aforementioned object, a front pillar structure of a first aspect is provided with a pillar frame component that forms part of a front pillar, and that is formed with a closed cross-sectional configuration formed from a first component having a vehicle cabin outer-side flange portion and a vehicle cabin inner-side flange portion and extending substantially in a vehicle vertical direction, and a second component having a vehicle cabin outer-side flange portion and a vehicle cabin inner-side flange portion and extending substantially in the vehicle vertical direction, the respective vehicle cabin outer-side flange portions and the respective vehicle cabin inner-side flange portions being overlaid and joined together, and a pillar garnish that forms a part of the front pillar, and that has a surface covering portion that extends substantially in the vehicle vertical direction and covers the pillar frame component from the vehicle cabin inner side, and an elastic body that is joined to a wall surface facing the pillar frame component of the surface covering portion, the elastic body firmly gripping the vehicle cabin inner-side flange portion of at least one of the first component or the second component.

According to the front pillar structure of the first aspect, a pillar garnish is attached to a pillar frame component as a result of an elastic body, which is joined to a wall surface facing a pillar frame component of a surface covering portion, firmly gripping inside itself a vehicle cabin inner-side flange portion of at least one of a first component and a second component that each form part of a pillar frame component having a closed cross-sectional configuration. In other words, it is not necessary for a flat surface portion to be formed facing a vehicle occupant in order to attach the pillar garnish to the pillar frame component. Accordingly, compared with a structure that is provided with this flat surface portion, the front pillar can be made more slender.

A front pillar structure of a second aspect is the front pillar structure of the first aspect in which, in a planar cross-sectional view, the vehicle cabin inner-side flange portion firmly gripped an interior of the elastic body protrudes towards an upper body of a vehicle seated at a seat.

According to the front pillar structure of the second aspect, when looked at in a planar cross-sectional view, the vehicle cabin inner-side flange portion firmly gripped by the interior of the elastic body protrudes towards an upper body of a vehicle occupant who is sitting in a seat. Accordingly, a front pillar can be made even more slender, and any blind spot created by a front pillar when a vehicle occupant is looking out from inside a vehicle cabin is reduced.

A front pillar structure of a third aspect is the front pillar structure of the first or second aspects in which a distal end portion of the vehicle cabin inner-side flange portion firmly gripped by an interior of the elastic body has a portion that, is bent substantially at a right angle in a planar cross-sectional view.

According to the front pillar structure of the third aspect, a distal end portion of the vehicle cabin inner-side flange portion firmly gripped by the interior of the elastic body has a portion that, is bent substantially at a right angle in a planar cross-sectional view. Accordingly, the elastic body is firmly held by the distal end portion of the vehicle cabin inner-side flange portion. In other words, it is difficult for the pillar garnish to come loose from the pillar frame component.

A front pillar structure of a fourth aspect is the front pillar structure of any one of the first through third aspects in which the surface covering portion is formed substantially in a U-shape that is open towards the vehicle cabin outer side in a planar cross-sectional view.

According to the front pillar structure of the fourth aspect, the surface covering portion of the pillar garnish is formed substantially in a U-shape that is open towards the vehicle cabin outer side in a planar cross-sectional view. Accordingly, compared with when the surface covering portion of the pillar garnish is not formed substantially in a U-shape that is open towards the vehicle cabin outer side in a planar cross-sectional view, the front pillar can be made even more slender.

A front pillar structure of a fifth aspect is the front pillar structure of any one of the first through fourth aspects in which a notch is formed in the elastic body, and the vehicle cabin inner-side flange portion of at least one of the first component or the second component is inserted into the notch portion.

According to the front pillar structure of the fifth aspect, the vehicle cabin inner-side flange portion can be firmly gripped inside the elastic body by means of a simple structure.

As is described above, according to the present disclosure, a front pillar can be made more slender.

BRIEF DESCRIPTION OF THE DRAWINGS

Exemplary embodiments of the present disclosure will be described in detail based on the following figures, wherein.

DETAILED DESCRIPTION

Hereinafter, an exemplary embodiment according to the present disclosure will be described in detail based on the drawings. Note that an arrow UR an arrow FR, and an arrow RH that are shown in the appropriate drawings respectively indicate a vehicle upward direction, a vehicle forward direction, and a vehicle right-side direction. Accordingly, if front-rear, left-right, or up-down directions are used in the following description, then, unless specifically stated otherwise, these refer respectively to the front-rear directions of the vehicle, the left-right directions of the vehicle (i.e., the vehicle width direction), and the up-down directions of the vehicle (i.e., the vehicle vertical direction).

Figure 1:
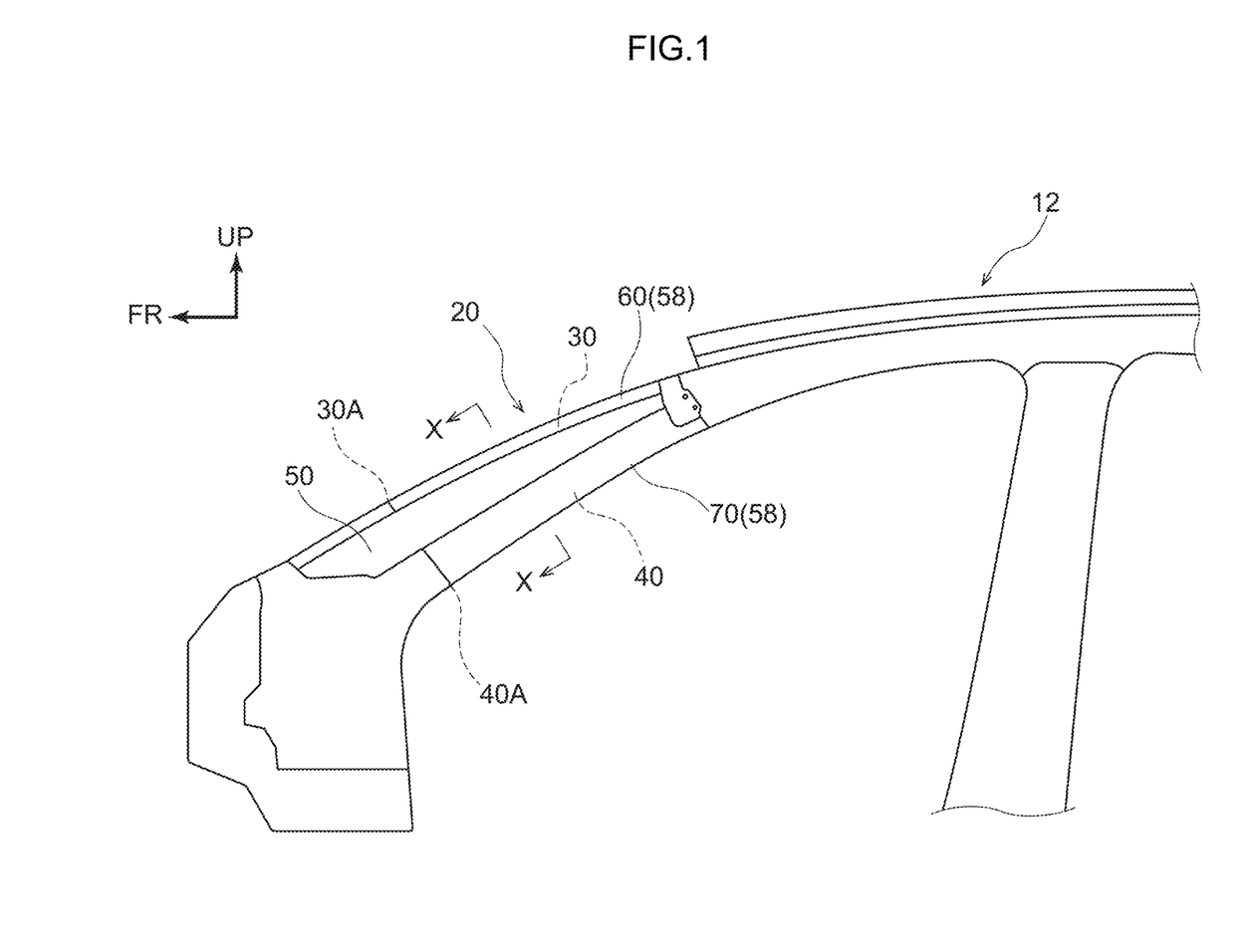
FIG. 1 is a side view showing an A-pillar provided with a front pillar structure according to the present exemplary embodiment.
Figure 2:
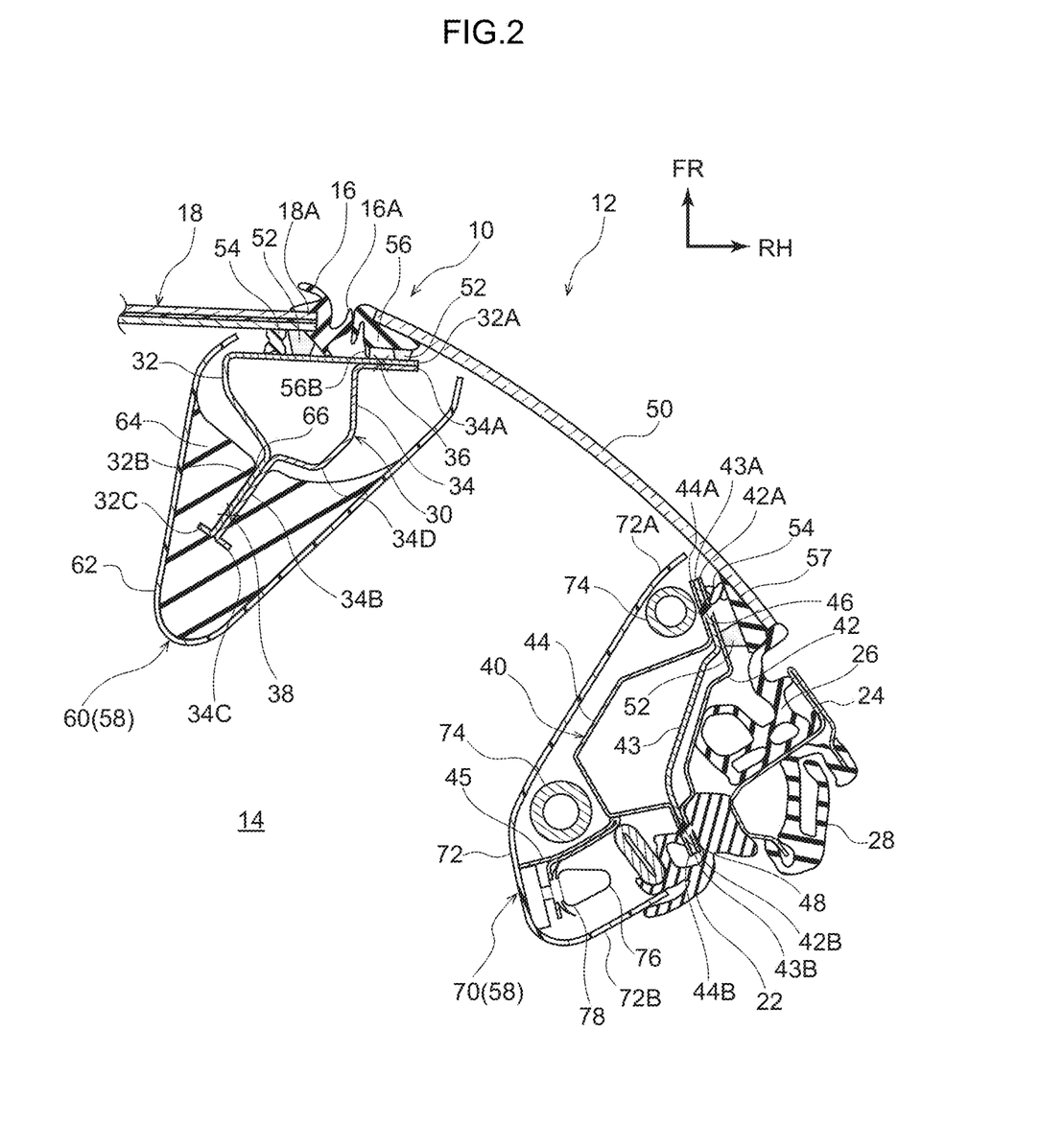
FIG. 2 is a cross-sectional view taken across a line X-X in FIG. 1 showing the front pillar structure according to the present exemplary embodiment.

As is shown in FIG. 2, front windshield glass (hereinafter, referred to as 'front glass') 18 that is inclined so as to slope toward the vehicle upper side approaching the vehicle rear side, and that forms a partition between an inside of a vehicle cabin 14 and an outside of the vehicle cabin 14 is provided in a vehicle 12. In addition, as is shown in FIG. 1, a pair of left and right front pillars (hereinafter, referred to as 'A-pillars') 20 in which a front pillar structure 10 according to the present exemplary embodiment has been applied are provided on outer sides in the vehicle width direction of the front glass 18, and so as to be at a vehicle front side of front side-windows of front doors (not shown in the drawings).

The pair of left and right A-pillars 20 extend respectively alongside outer-side end portions 18A in the vehicle width direction of the front glass 18 (see FIG. 2) such that a longitudinal direction thereof extends substantially in the vehicle up-down direction. In other words, the pair of left and right A-pillars 20 are both inclined so as to slope toward the vehicle upper side approaching the vehicle rear side. Note that because the A-pillars 20 on both the left side (for example, the front passenger's side) and the right side (for example, the driver's side) have the same structure apart from having left-right symmetry, in the following description, only the right side A-pillar 20 is described.

As is shown in FIG. 2, the A-pillar 20 has a front pillar 30, which is serving as a front-side pillar frame component, and a rear pillar 40, which is serving as a rear-side pillar frame component. The front pillar 30 extends substantially in the vehicle up-down direction, and as is shown in detail in FIG. 3, the outer-side end portion 18A in the vehicle width direction of the front glass 18 is joined via a urethane adhesive agent 52 and cushion rubber 54 to the front pillar 30.

Figure 3:
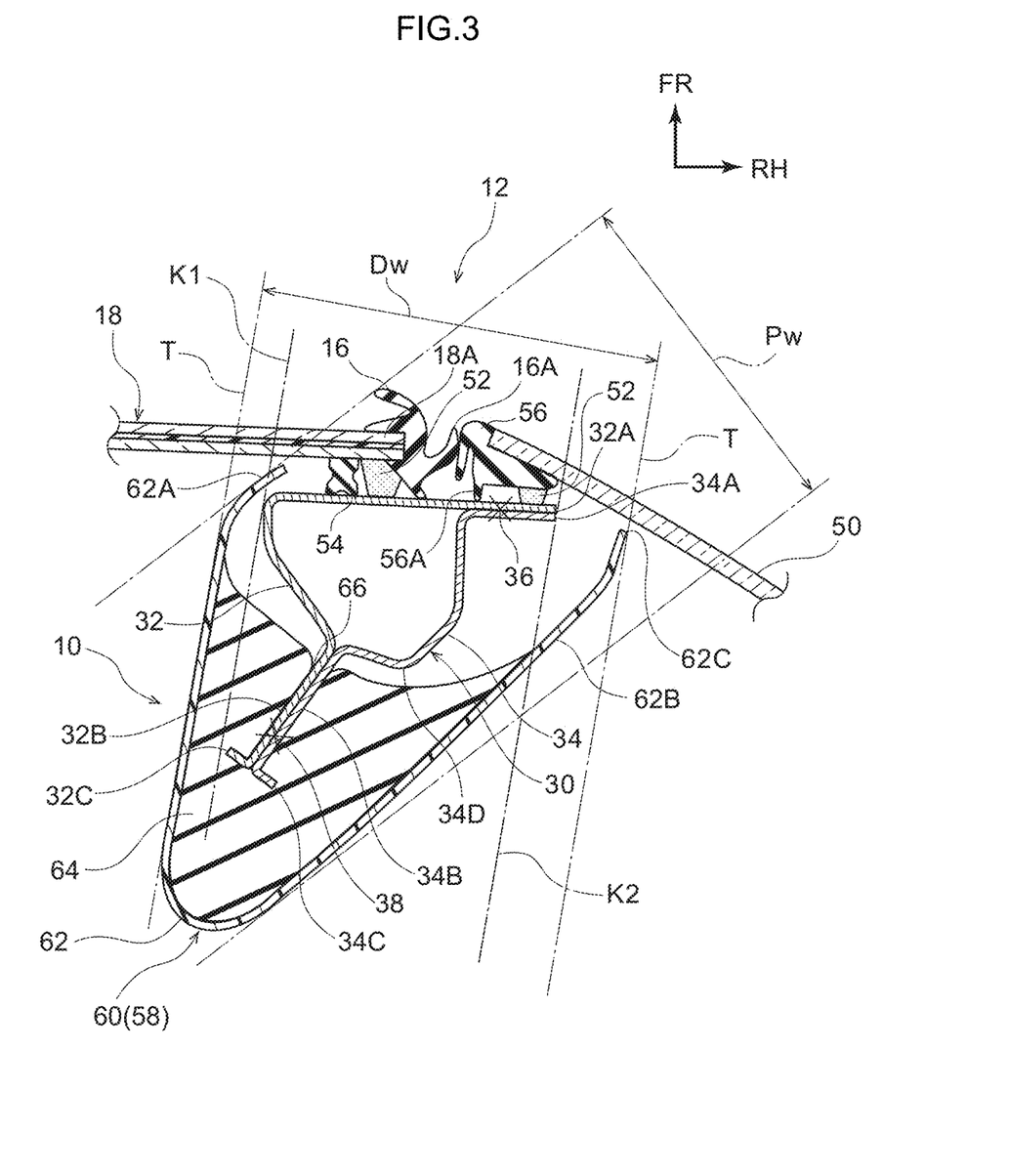
FIG. 3 is an enlarged cross-sectional view of a portion of FIG. 2 showing the front pillar structure according to the present exemplary embodiment.

The front pillar 30 is formed so as to include a front-side pillar outer panel 32 that is made from steel plate and serves as a first component, and a front-side pillar inner panel 34 that is made from steel plate and serves as a second component. A cross-sectional shape of the front-side pillar outer panel 32 that is orthogonal to a longitudinal direction thereof (i.e., to the direction thereof that extends substantially in the vehicle up-down direction) is formed substantially in a hat shape (when looked at in a planar cross-sectional view), and a cross-sectional shape of the front-side pillar inner panel 34 that is orthogonal to a longitudinal direction thereof (i.e., to the direction thereof that extends substantially in the vehicle up-down direction) is also formed substantially in a hat shape (when looked at in a planar cross-sectional view).

Note that a ridgeline portion (i.e., a corner portion) 34D extending in the longitudinal direction is formed on a vehicle rear side of the front-side pillar inner panel 34. Consequently, the front pillar 30, which has a closed cross-sectional configuration, is formed by the front-side pillar outer panel 32 and the front-side pillar inner panel 34. In other words, the front-side pillar inner panel 34 is provided facing substantially towards the vehicle rear side of the front-side pillar outer panel 32, and the front-side pillar outer panel 32 and the front-side pillar inner panel 34 are joined together via spot-welding.

More specifically, an outer-side flange portion 32A, which is an end portion on the outer side in the vehicle width direction (i.e. on the outer side of the vehicle cabin 14) of the front-side pillar outer panel 32, and an outer-side flange portion 34A, which is an end portion on the outer side in the vehicle width direction (i.e. on the outer side of the vehicle cabin 14) of the front-side pillar inner panel 34, are mutually superimposed with each other, and this mutually superimposed portion is spot-welded. In other words, plural spot-welding portions 36 are formed in the outer-side flange portion 32A and the outer-side flange portion 34A at predetermined intervals from each other (i.e., intermittently) in the longitudinal direction thereof.

In addition, an inner-side flange portion 32B, which is an end portion on the inner side in the vehicle width direction (i.e. on the inner side of the vehicle cabin 14) of the front-side pillar outer panel 32, and an inner-side flange portion 34B, which is an end portion on the inner side in the vehicle width direction (i.e. on the inner side of the vehicle cabin 14) of the front-side pillar inner panel 34, are mutually superimposed with each other, and this mutually superimposed portion is spot-welded. In other words, plural spot-welding portions 38 are formed in the inner-side flange portion 32B and the inner-side flange portion 34B at predetermined intervals from each other (i.e., intermittently) in the longitudinal direction thereof.

The inner-side flange portion 32B and the inner-side flange portion 34B protrude towards an upper body of a vehicle occupant who is sitting in a front seat (for example, a driver's seat: not shown in the drawings). The 'vehicle occupant' referred to here is an internationally integrated side impact dummy (World Side Impact Dummy World SID) AM50 (i.e., representing the 50th percentile of American adult males), or an internationally integrated side impact dummy AF05 (i.e., the 5th percentile of American adult females). Distal end portions of the inner-side flange portion 32B and the inner-side flange portion 34B are formed as bent portions 32C and 34C that are bent substantially at right angles in mutually opposite directions from each other when looked at in a planar cross-sectional view.

As is shown in FIG. 2, the rear pillar 40 is disposed substantially on the vehicle rear side of the front pillar 30. In other words, the rear pillar 40 is disposed at a predetermined distance substantially in the vehicle front-rear direction from the front pillar 30, and extends (substantially in the vehicle up-down direction) substantially in parallel with the front pillar 30.

The rear pillar 40 is formed so as to include a rear-side pillar outer panel 42 that is made from steel plate, a rear-side pillar reinforcement 43 that is made from steel plate, and a rear-side pillar inner panel 44 that is made from steel plate. The rear-side pillar outer panel 42 and the rear-side pillar reinforcement 43 are formed in a substantially planar shape, and a cross-sectional shape of the rear-side pillar inner panel 44 that is orthogonal to a longitudinal direction thereof (i.e., to a direction thereof that extends substantially in the vehicle up-down direction) is formed substantially in a hat shape (when looked at in a planar cross-sectional view).

The rear pillar 40 which has a closed cross-sectional configuration is formed by the rear-side pillar outer panel 42, the rear-side reinforcement 43, and the rear-side pillar inner panel 44. In other words, the rear-side reinforcement 43 and the rear-side pillar inner panel 44 are provided facing substantially towards the inner side in the vehicle width direction of the rear-side pillar outer panel 42, and the rear-side pillar outer panel 42, the rear-side reinforcement 43, and the rear-side pillar inner panel 44 are joined together via spot-welding.

More specifically, a front-side flange portion 42A, which is an end portion on the vehicle front side of the rear-side pillar outer panel 42, a front-side flange portion 43A, which is an end portion on the vehicle front side of the rear-side pillar reinforcement 43, and a front-side flange portion 44A, which is an end portion on the vehicle front side of the rear-side pillar inner panel 44 are mutually superimposed with each other, and this mutually superimposed portion is spot-welded. In other words, plural spot-welding portions 46 are formed in the front-side flange portion 42A, the front-side flange portion 43A, and the front-side flange portion 44A at predetermined intervals from each other in the longitudinal direction thereof.

Next, a rear-side flange portion 42B, which is an end portion on the vehicle rear side of the rear-side pillar outer panel 42, a rear-side flange portion 43B, which is an end portion on the vehicle rear side of the rear-side pillar reinforcement 43, and a rear-side flange portion 44B, which is an end portion on the vehicle rear side of the rear-side pillar inner panel 44 are mutually superimposed with each other, and this mutually superimposed portion is spot-welded.

In other words, plural spot-welding portions 48 are formed in the rear-side flange portion 42B, the rear-side flange portion 43B, and the rear-side flange portion 44B at predetermined intervals from each other in the longitudinal direction thereof. Note that an opening weather strip 22 which is made from resin (i.e., made from rubber) is attached to the mutually superimposed rear-side flange portion 42B, rear-side flange portion 43B, and rear-side flange portion 44B by being fitted onto these substantially from the vehicle rear side.

In addition, A-pillar glass 50, which is serving as a transparent component, is made to bridge the gap between the front pillar 30 and the rear pillar 40 via pillar glass moldings 56 and 57 (described below), and via the cushion rubber 54 and the urethane adhesive agent 52. Note that the A-pillar glass 50 is a transparent window component whose plate thickness direction is substantially the same as the vehicle width direction, and when looked at in a side view, the A-pillar glass 50 is inclined so as slope towards the vehicle rear side approaching the vehicle upper side (see FIG. 1). Moreover, the A-pillar glass 50 is not limited to being glass, and may instead be formed, for example, from transparent fiber-reinforced resin or the like.

As is shown in FIG. 3, the pillar glass molding 56, which is formed from resin (i.e., from rubber) substantially in the shape of a right-angle triangle when looked at in plan view and whose right-angle portion is disposed on the inner side in the vehicle width direction and on the vehicle rearward side, is integrally attached to a front end portion of the A-pillar glass 50. In addition, a protruding portion 56A that is used for positioning is formed integrally with a wall surface of the pillar glass molding 56 that faces towards the inner side of the vehicle cabin 14. The urethane adhesive agent 52 is adhered to the outer side in the vehicle width direction of this protruding portion 56A.

As is shown in FIG. 2, the pillar glass molding 57, which is formed from resin (i.e., from rubber) substantially in the shape of a right-angle triangle when looked at in plan view and whose right-angle portion is disposed on the outer side in the vehicle width direction and on the vehicle rearward side, is integrally attached to a rear end portion of the A-pillar glass 50. In addition, the urethane adhesive agent 52 is adhered to the vehicle rearward side of a wall surface of the pillar glass molding 57 that faces towards the inner side of the vehicle cabin 14. The cushion rubber 54 is attached to the vehicle front side of this wall surface.

The front end portion of the A-pillar glass 50 is attached to the front pillar 30 as a result of the pillar glass molding 56 being bonded thereto by means of the urethane adhesive agent 52, while being positioned from the vehicle front side on the outer-side flange portion 32A via the protruding portion 56A. The rear end portion of the A-pillar glass 50 is attached to the rear pillar 40 as a result of the pillar glass molding 57 being bonded thereto by means of the urethane adhesive agent 52, while being positioned from the outer side in the vehicle width direction on the front-side flange portion 42A via the cushion rubber 54.

As is shown in FIG. 2 and FIG. 3, molding 16, which is made from resin (i.e., made from rubber) and serves as a sealing component, is attached to the outer-side end portion 18A in the vehicle width direction of the front glass 18 by being fitted over this outer-side end portion 18A from the outer side in the vehicle width direction. In addition, an outer-side end portion 16A in the vehicle width direction of this molding 16 is made to abut against the pillar glass molding 56 while being elastically deformed (i.e., via a predetermined pressure) so that no gaps remain between the outer-side end portion 16A and the pillar glass molding 56. Any intrusion of rainwater or the like between the A-pillar 50 and the front glass 18 is prevented by the molding 16 provided between the outer-side end portion 18A in the vehicle width direction of the front glass 18 and the pillar glass molding 56.

Moreover, as is shown in FIG. 2, a front-door door frame 42 is disposed on the outer side in the vehicle width direction of the rear-side pillar outer panel 42. A door weather strip 26 is provided on the vehicle front side of the door frame 24, and a glass run 28 is provided on the vehicle rear side of the door frame 24.

As is shown in FIG. 2 and FIG. 3, an A-pillar garnish 58 is provided on an inner side in the vehicle width direction of the front pillar 30 and the rear pillar 40. The A-pillar garnish 58 is made from resin (i.e., containing rubber), and is formed so as to include a front-side pillar garnish 60, which is provided on the vehicle cabin 14 inner side of the front pillar 30, and a rear-side pillar garnish 70, which is provided on the vehicle cabin 14 inner side of the rear pillar 40.

The front-side pillar garnish 60 has a main body portion 62 that serves as a surface covering portion and extends in the vehicle up-down direction alongside the front pillar 30, and a rubber portion 64 that serves as an elastic body and is joined integrally via an adhesive agent or the like to an inner surface of the main body portion 62 (i.e., to a wall surface thereof that faces the front pillar 30). The main body portion 62 may be formed, as an example, from polypropylene (PP), and the rubber portion 64 may be formed, as an example, from ethylene propylene diene rubber (EPDM), however, the present disclosure is not particularly limited to these materials. It is also possible for the rubber portion 64 to be formed instead from another rubber material that has elasticity, from an elastomer that has elasticity, or from a resin that has elasticity.

Note that, as is shown in FIG. 1, as seen in a side view looking from the vehicle width direction, if a boundary portion between a circular-arc shaped portion and a straight-line shaped portion of a lower end portion of the rear pillar 40 is taken as a boundary portion 40A, and if a portion of the front pillar 30 that is located opposite the boundary portion 40A in an orthogonal direction relative to the direction in which the A-pillar 20 extends is taken as a specific portion 30A, then it is sufficient for the rubber portion 64 to be provided at least on the upper side of this specific portion 30A. A lower end portion of the main body portion 62 is inserted into an insertion aperture (not shown in the drawings) that is formed in an instrument panel (not shown in the drawings), and an upper end portion of the main body portion 62 abuts against a roof head liner (not shown in the drawings).

As is shown in FIG. 3, the main body portion 62 of the front-side pillar garnish 60 is formed substantially in a U-shape, and a cross-sectional shape (when looked at in a planar cross-sectional view) of this U-shape which is orthogonal to the longitudinal direction thereof is open substantially towards an outer side in the vehicle width direction (i.e., towards the outer side of the vehicle cabin 14). This main body portion 62 covers the front pillar 30 (including the inner-side flange portions 32B and 34B, and the outer-side flange portions 32A and 34A) from the vehicle cabin 14 inner side without coming into contact therewith.

Note that, in the planar cross-sectional view shown in FIG. 3, a rear-side side wall portion 62B of the main body portion 62 that faces the front-side pillar inner panel 34 is formed longer than a front-side side wall portion 62A thereof that faces the front-side pillar outer panel 32, and a distal end portion 62C of the side wall portion 62B is bent slightly towards the vehicle front side so as to be disposed further to the inner side in the vehicle width direction compared to if it had not been bent.

In other words, the distal end portion 62C of the side wall portion 62B is disposed so as to be closer to the outer-side flange portion 32A and the outer-side flange portion 34A. As a result, this aids in forming a structure in which a blind spot Dw created by the front-side pillar garnish 60 as seen by a vehicle occupant from the driver's seat side is smaller than the interpupillary distance of this vehicle occupant. In addition, a structure is formed in which a blind spot Pw created by the front-side pillar garnish 60 as seen by a vehicle occupant from the passenger's seat side is smaller than the interpupillary distance of this vehicle occupant.

Note that the term 'interpupillary distance' refers to the distance between the center of the pupil of the right eye and the center of the pupil of the left eye of a vehicle occupant who is seated in a front seat (either the driver's seat or the passenger's seat), and in the case, for example, of a Japanese adult is from 60~65 mm. In the present exemplary embodiment, as an example, this interpupillary distance is set to 65 mm.

Moreover, as is shown in FIG. 3, the inner-side flange portions 32B and 34B are disposed in an area between a virtual tangent K1 that is parallel with single-dot chain lines T which show the blind spot Dw created by the front-side pillar garnish 60 as seen by a vehicle occupant from the driver's seat side, and is located on an end portion on the inner side in the vehicle width direction of the front-side pillar outer panel 32, and a virtual tangent K2 that is also parallel with the single-dot chain lines T, and is located on an end portion on the outer side in the vehicle width direction of the outer-side flange portions 32A and 34A.

In addition, when looked at in a planar cross-sectional view, a notch portion 66, which is cut to a predetermined depth so as to enable the inner-side flange portion 32B and the inner-side flange portion 34B to be firmly gripped inside it, is formed substantially in a central portion in the vehicle width direction of the surface of the rubber portion 64, which is bonded to the inner surface of the main body portion 62, that faces towards the front pillar 30. By inserting the inner-side flange portion 32B and the inner-side flange portion 34B inside this notch portion 66, the inner-side flange portion 32B and the inner-side flange portion 34B are pressed from both substantially the outer side and the inner side in the vehicle width direction by the rubber portion 64, and are consequently clamped therein. As a result, the front-side pillar garnish 60 is attached to the front pillar 30.

Note that the distal end portions of the inner-side flange portion 32B and the inner-side flange portion 34B are formed as the bent portions 32C and 34C that are bent substantially at right angles in mutually opposite directions from each other, and the bent portions 32C and 34C are able to be inserted inside the notch portion 66 because the rubber portion 64 is able to be appropriately elastically deformed. Additionally, it is also possible to employ a structure in which not only are the inner-side flange portion 32B and the inner-side flange portion 34B firmly gripped inside the notch portion 66 (i.e., clamped by the rubber portion 64), but, in addition to being firmly gripped inside the notch portion 66, they are also adhered thereto via an adhesive agent which is coated on an internal surface of the notch portion 66.

As is shown in FIG. 2, the rear-side pillar garnish 70 has a main body portion 72 that extends substantially in the vehicle up-down direction alongside the rear pillar 40. In the same way as the front-side pillar garnish 60, a lower end portion of the main body portion 72 is inserted inside an insertion aperture formed in the instrument panel, while an upper end portion of the main body portion 72 abuts against the roof head liner.

The main body portion 72 of the rear-side pillar garnish 70 is formed substantially in a U-shape, and a cross-sectional shape (when looked at in a planar cross-sectional view) of this U-shape which is orthogonal to the longitudinal direction thereof is open substantially towards an outer side in the vehicle width direction (i.e., towards the outer side of the vehicle cabin 14). This main body portion 72 covers the rear pillar 40 from the vehicle cabin 14 inner side without coming into contact therewith. Note that, in the planar cross-sectional view shown in FIG. 2, a front-side side wall portion 72A of the main body portion 72 that faces the rear-side pillar inner panel 44 is formed longer than a rear-side side wall portion 72B thereof, and a wire harness 74 is disposed between the rear-side pillar garnish 70 and the rear pillar 40.

Plural clips 76, which are shaped substantially like an arrow and have a wide diameter portion 78 at a distal end side thereof, are provided at predetermined intervals from each other in the longitudinal direction of the main body portion 72 on an inner surface of the rear-side pillar garnish 70. These clips 76 (i.e. the wide diameter portions 78) are formed so as to be able to be elastically deformed in an orthogonal direction relative to the direction in which they protrude, and stand upright on the inner surface (i.e., the inner wall surface) of the main body portion 72 so as to be able to be located opposite a supporting portion 45 that is provided integrally with the rear-side pillar inner panel 44.

Rectangular through holes (not shown in the drawings) that are slightly smaller than an outer diameter of the wide diameter portions 78 are formed in the supporting portion 45 that is provided integrally with the rear-side pillar inner panel 44. The rear-side pillar garnish 70 is attached to the rear pillar 40 as a result of the wide diameter portion 78 of the clips 76 being inserted (i.e., squeezed) into the through holes in the supporting portion 45 while simultaneously being elastically deformed, so that the wide diameter portions 78 subsequently revert to their normal diameter.

An action of the front pillar structure 10 according to the present exemplary embodiment which has the above-described structure will now be described.

Figure 5:
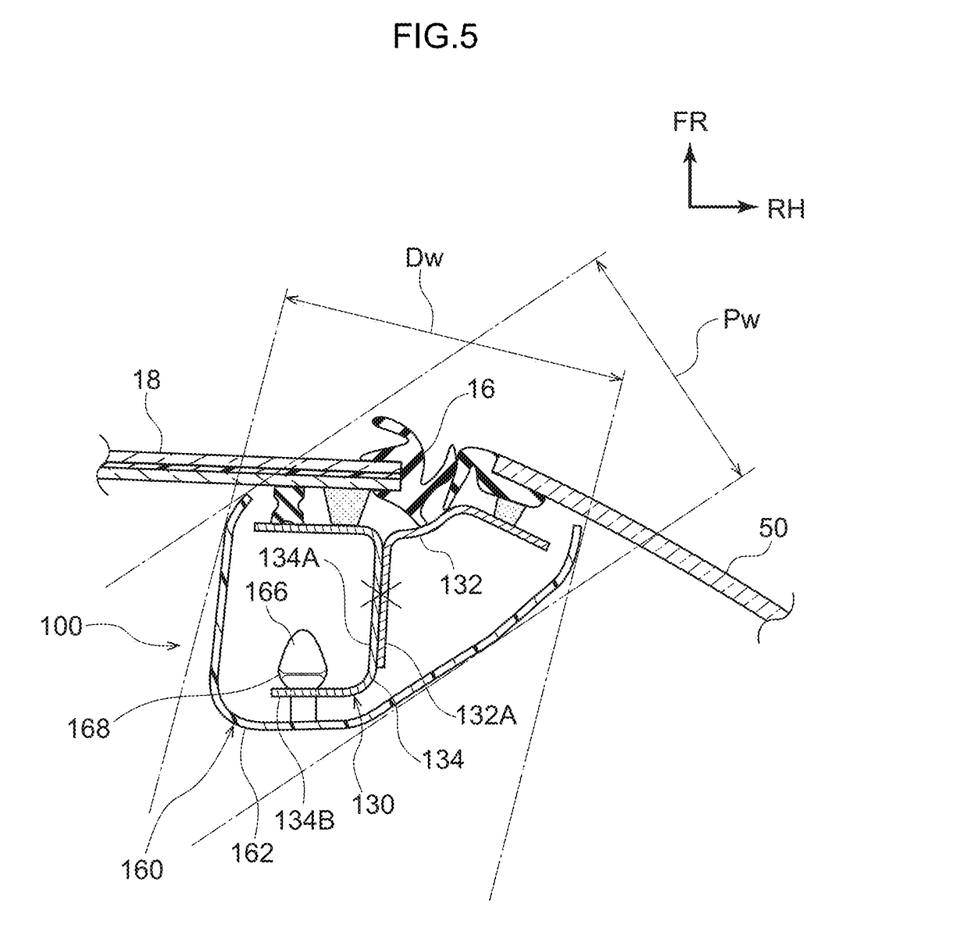
FIG. 5 is a cross-sectional view corresponding to FIG. 3 showing a front pillar structure according to a comparative example.

Firstly, a front pillar structure 100 according to a comparative example that is shown in FIG. 5 will be described. As is shown in FIG. 5, in the front pillar structure 100, a front-side pillar outer panel 132 is formed substantially in a U-shape when looked at in a planar cross-sectional view that is open towards the rearward and outer side in the vehicle width direction, and a front-side pillar inner panel 134 is formed substantially in a C-shape when looked at in a planar cross-sectional view that is open towards the inner side in the vehicle width direction.

A front pillar 130 is formed as a result of an inner wall 132A that is disposed on the inner side in the vehicle width direction of the front-side pillar outer panel 132 being joined via spot-welding to an outer wall 134A that is disposed on the outer side in the vehicle width direction of the front-side pillar inner panel 134. Moreover, a rear wall 134B that is disposed on a vehicle rear side of the front-side pillar inner panel 134 forms a flat surface portion that faces towards a vehicle occupant, and through holes (not shown in the drawings) that are slightly smaller than an outer diameter of wide diameter portions 168 (described below) are formed in this rear wall 134B.

A main body portion 162 of the front-side pillar garnish 160 is formed substantially in a U-shape, and a cross-sectional shape (when looked at in a planar cross-sectional view) of this U-shape which is orthogonal to the longitudinal direction thereof is open towards the vehicle front side. This main body portion 162 covers the front pillar 130 from the vehicle cabin 14 inner side without coming into contact therewith. Plural clips 166, which are shaped substantially like an arrow and have a wide diameter portion 168 at a distal end side thereof, are provided at predetermined intervals from each other in the longitudinal direction of the main body portion 162 on an inner surface of the front-side pillar garnish 160.

These clips 166 (i.e. the wide diameter portions 168) are formed so as to be able to be elastically deformed in an orthogonal direction relative to the direction in which they protrude, and stand upright on an inner surface (i.e., an inner wall surface) of the main body portion 162 so as to be able to be located opposite the rear wall 134B of the front-side pillar inner panel 134. Accordingly, the front-side pillar garnish 160 is attached to the front pillar 30 as a result of the wide diameter portion 168 of the clips 166 being inserted (i.e., squeezed) into the through holes while simultaneously being elastically deformed, so that the wide diameter portions 168 subsequently revert to their normal diameter.

In other words, because the rear wall 134B serving as a flat surface portion which faces towards a vehicle occupant and is used to attach the clips 166 is provided in the front pillar structure 100 according to the comparative example, the front pillar 130 and the front-side pillar garnish 160 have a considerable width (i.e., have a considerable size substantially in the vehicle width direction). Accordingly, the blind spot Dw created by the front-side pillar garnish 160 as seen by a vehicle occupant from the driver's seat side is larger than the interpupillary distance of this vehicle occupant. In addition, the blind spot Pw created by the front-side pillar garnish 160 as seen by a vehicle occupant from the passenger's seat side is larger than the interpupillary distance of this vehicle occupant.

In contrast to this, in the front pillar structure 10 according to the present exemplary embodiment, as is shown in FIG. 3, the front-side pillar garnish is attached to the front pillar 30 as a result of the rubber portion 64 that is joined to the inner surface of the main body portion 62 of the front-side pillar garnish 60 firmly gripping (i.e., clamping) inside itself the inner-side flange portions 32B and 34B of the front-side pillar outer panel 32 and the front-side pillar inner panel 34 that form the front pillar 30.

In other words, it is not necessary to form a flat surface portion on the front pillar 30 facing a vehicle occupant in order to attach the front-side pillar garnish 60. Accordingly, compared with when this flat surface portion is provided (i.e., compared with the structure of the front pillar structure 100 according to the comparative example), the front pillar 30 and the front-side pillar garnish 60 (i.e., the A-pillar 20) can be made more slender.

In particular, if the inner-side flange portions 32B and 34B that are firmly gripped (i.e., clamped) inside the rubber portion 64 protrude (when looked at in a planar cross-sectional view) towards the upper body of a vehicle occupant who is sitting in a seat (i.e., if the inner-side flange portions 32B and 34B are disposed within the area between the virtual tangent K1 and the virtual tangent K2), then the front pillar 30 and the front-side pillar garnish 60 (i.e., the A-pillar 20) can be made even more slender. Accordingly, the blind spot created by the front-side pillar garnish 60 (i.e., by the A-pillar 20) as seen by a vehicle occupant from inside the vehicle cabin 14 can be reduced.

More specifically, the blind spot Dw created by the front-side pillar garnish 60 as seen by a vehicle occupant from the driver's seat side can be made smaller than the interpupillary distance of this vehicle occupant and, in addition, the blind spot Pw created by the front-side pillar garnish 60 as seen by a vehicle occupant from the passenger's seat side can be made smaller than the interpupillary distance of this vehicle occupant. As a result, the field of view of the vehicle occupants can be widened.

Moreover, the main body portion 62 of the front-side pillar garnish 60 that covers the front pillar 30 (i.e., the inner-side flange portions 32B and 34B, and the outer-side flange portions 32A and 34A) from the inner side of the vehicle cabin 14 is formed substantially in a U-shape, that, when looked at in a planar cross-sectional view, is open towards the outer side of the vehicle cabin 14. Accordingly, compared with when the main body portion 62 of the front-side pillar garnish 60 is not formed substantially in a U-shape that is open towards the outer side of the vehicle cabin 14 when looked at in a planar cross-sectional view, the front-side pillar garnish 60 (i.e., the A-pillar 20) can be made even more slender.

Moreover, distal end portions of the inner-side flange portions 32B and 34B that are firmly gripped (i.e., clamped) inside the rubber portion 64 are formed as the bent portions 32C and 34C that are bent substantially at right angles when looked at in a planar cross-sectional view. Accordingly, the rubber portion 64 is firmly held by the bent portions 32C and 34C of the inner-side flange portions 32B and 34B. In other words, it is difficult for the front-side pillar garnish 60 to come loose from the front pillar 30.

In addition, because the rubber portion 64 is provided on the inner surface of the front-side pillar garnish 60 (i.e., at least on the inner surface on the upper side of the specific portion 30A of the front pillar 30 shown in FIG. 1), even if, for example, the vehicle 12 is in a frontal collision so that a head portion of the driver (i.e., of a vehicle occupant) is moved by inertial force towards the front-side pillar garnish 60 side and strikes against this front-side pillar garnish 60, the injury value to the head portion of this driver (i.e., vehicle occupant) can be reduced.

Figure 4A:
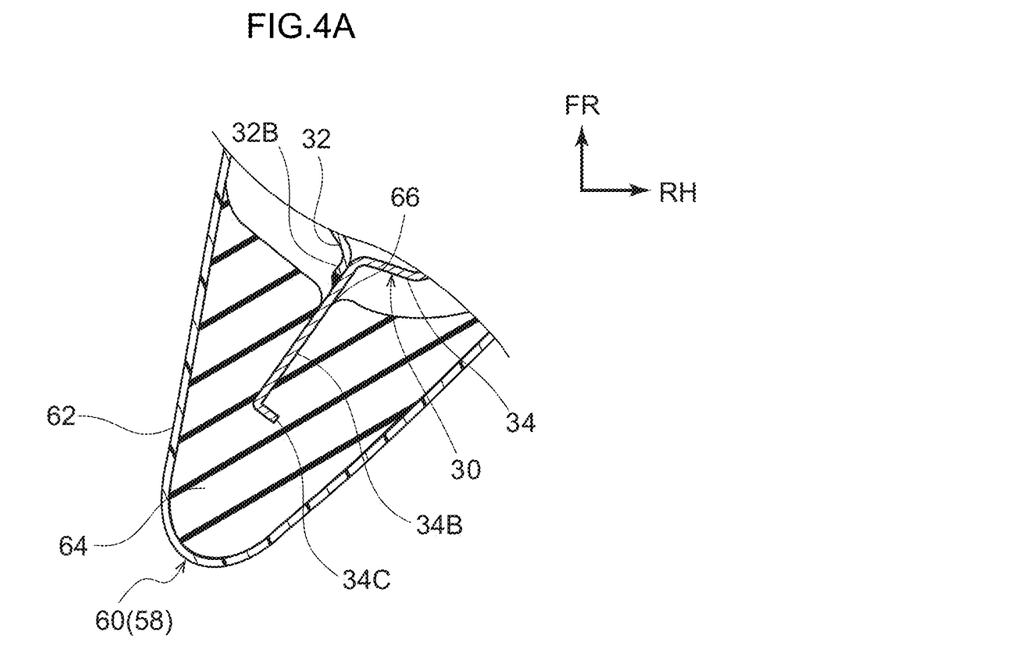
FIG. 4A is a cross-sectional view corresponding to FIG. 3 showing a variant example of the front pillar structure according to the present exemplary embodiment.
Figure 4B:
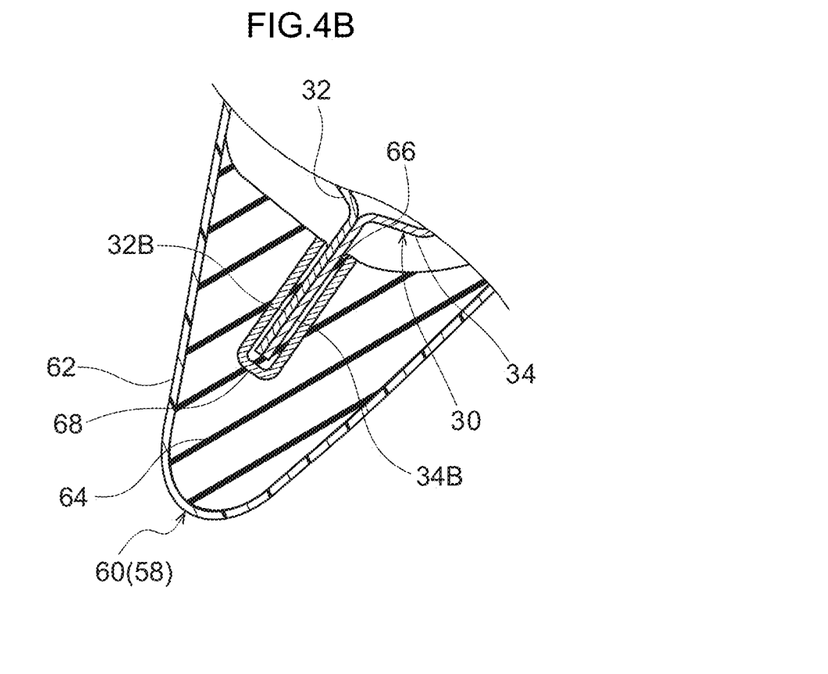
FIG. 4B is a cross-sectional view corresponding to FIG. 3 showing another variant example of the front pillar structure according to the present exemplary embodiment.

Note that the shape of the front pillar 30 is not limited to that shown in FIG. 3, and the front pillar 30 may instead be formed, for example, in a shape such as that shown in FIGS. 4A and 4B. In other words, it is also possible to employ a structure in which the protrusion length, when looked at in a planar cross-sectional view, of the inner-side flange portion 32B of the front-side pillar outer panel 32 is shortened, and the distal end portion thereof is linearly welded (i.e., line-welded) via arc-welding or laser-welding to the inner-side flange portion 34B of the front-side pillar inner panel 34.

In this case, the front-side pillar garnish 60 is attached to the front pillar 30 by only inserting the inner-side flange portion 34B of the front-side pillar inner panel 34 relatively into the notch portion 66 in the rubber portion 64. Note that inversely to the structure shown in the drawing, it is also possible to employ a structure in which the protrusion length, when looked at in a planar cross-sectional view, of the inner-side flange portion 34B of the front-side pillar inner panel 34 is shortened, and the distal end portion thereof is linearly welded (i.e., line-welded) via arc-welding or laser-welding to the inner-side flange portion 32B of the front-side pillar outer panel 32.

Moreover, as is shown in FIG. 4B, it is also possible to alter the structures of the front pillar 30 and the rubber portion 64. In other words, instead of forming the respective bent portions 32C and 34C on the inner-side flange portion 32B of the front-side pillar outer panel 32 and the inner-side flange portion 34B of the front-side pillar inner panel 34, a substantially U-shaped core metal 68 that opens towards the front pillar 30 side when looked at in a planar cross-sectional view may be embedded around the periphery of the notch portion 66 in the rubber portion 64.

In this type of structure as well, the front-side pillar garnish 60 is attached to the front pillar 30 by inserting the inner-side flange portion 32B of the front-side pillar outer panel 32 and the inner-side flange portion 34B of the front-side pillar inner panel 34 relatively into the notch portion 66 in the rubber portion 64. In other words, the rubber portion 64 is able to firmly hold (i.e., clamp) the inner-side flange portion 32B of the front-side pillar outer panel 32 and the inner-side flange portion 34B of the front-side pillar inner panel 34 via the metal core 68.

In addition to these, the outer-side flange portion 32A and the outer-side flange portion 34A are joined together via spot-welding, and the outer-side flange portion 32A and the outer-side flange portion 34A are formed so as to protrude towards the outer side in the vehicle width direction. Because of this, the space that is needed in order to insert a welding gun (not shown in the drawings) can be easily secured. Accordingly, the joining of the outer-side flange portion 32A and the outer-side flange portion 34A can be performed easily.

Moreover, when a load from the vehicle front side is applied to the A-pillar 20, the front pillar 30 attempts to undergo bending deformation towards the vehicle rear side, however, the front pillar 30 is formed having a closed cross-sectional shape, and the ridgeline portion 34D which extends in the longitudinal direction of the front-side pillar inner panel 34 is disposed on the rear portion side of the front pillar 30, which is the pressure deformation side thereof. Accordingly, torsional rigidity of the front pillar 30 can be improved, and the front pillar 30 can be provided with an ability to withstand compressive deformation of the rear portion thereof. Accordingly, it is possible to inhibit bending deformation (i.e., compressive deformation) of the front pillar 30.

Furthermore, the A-pillar 20 of the present exemplary embodiment is provided with the transparent A-pillar glass 50. Because of this, a driver (i.e., a vehicle occupant) is able to view the situation on the outer side of the A-pillar 20 via the A-pillar glass 50 through the gap between the front-side pillar garnish 60 (i.e., the front pillar 30) and the rear-side pillar garnish 70 (i.e., the rear pillar 40).

The front pillar structure 10 according to the present exemplary embodiment has been described above based on the drawings, however, the front pillar structure 10 according to the present exemplary embodiment is not limited to the structure illustrated above, and various design modifications and the like may be made thereto insofar as they do not depart from the spirit or scope of the present disclosure. For example, instead of being formed in a rectilinear shape in the planar cross-sectional view shown in the drawings, the notch portion 66 may be formed in a waveform shape (i.e., the notch may be cut in a waveform shape).

In addition, the inner-side flange portions 32B and 34B that are firmly gripped (i.e., clamped) inside the rubber portion 64 are not limited to structures that protrude towards the upper body of a vehicle occupant who is sitting in a seat. Provided that the inner-side flange portions 32B and 34B have a shape that can be firmly gripped by the inside of the rubber portion 64, then they may instead be bent slightly, for example, substantially in an L-shape when looked at in a planar cross-sectional view such that the distal end portion thereof face towards the front door side.

Moreover, the distal end portions of the inner-side flange portions 32B and 34B are not limited to being formed as the bent portions 32C and 34C that are bent substantially at right angles shown in the drawings, and it is also possible for the distal end portions of these bent portions 32C and 34C to be formed as bent portions (not shown in the drawings) that are bent yet again substantially at a right angle (i.e., that are bent substantially in a J-shape when looked at in planar cross-sectional view).

Furthermore, the present disclosure is not limited to a structure in which the rubber portion 64 is adhered via an adhesive agent to the inner surface of the main body portion 62, and it is possible to instead employ a structure in which the rubber portion 64 is formed integrally with the main body portion 62. Additionally, the present disclosure is not limited to a structure in which the front pillar 30 is formed by the front-side pillar outer panel 32 and the front-side pillar inner panel 34, and it is possible to instead employ a structure in which, for example, a front-side pillar reinforcement or the like (not shown in the drawings) is provided between these.

What is claimed is:

1. A front pillar structure, comprising:
a pillar frame component that forms part of a front pillar, and that is formed with a closed cross-sectional configuration formed from a first component having a vehicle cabin outer-side flange portion and a vehicle cabin inner-side flange portion and extending substantially in a vehicle vertical direction, and a second component having a vehicle cabin outer-side flange portion and a vehicle cabin inner-side flange portion and extending substantially in the vehicle vertical direction, the respective vehicle cabin outer-side flange portions and the respective vehicle cabin inner-side flange portions being overlaid and joined together; and
a pillar garnish that forms a part of the front pillar, and that has:
a surface covering portion that extends substantially in the vehicle vertical direction and covers the pillar frame component from the vehicle cabin inner side; and
an elastic body that is joined to a wall surface facing the pillar frame component of the surface covering portion, the elastic body firmly gripping the vehicle cabin inner-side flange portion of at least one of the first component or the second component.

2. The front pillar structure according to claim 1, wherein, in a planar cross-sectional view, the vehicle cabin inner-side flange portion firmly gripped by an interior of the elastic body protrudes towards an upper body of a vehicle occupant seated at a seat.

3. The front pillar structure according to claim 1, wherein a distal end portion of the vehicle cabin inner-side flange portion firmly gripped by an interior of the elastic body has a portion that is bent substantially at a right angle in a planar cross-sectional view.

4. The front pillar structure according to claim 3, wherein the distal end portion of the vehicle cabin inner-side flange portion firmly gripped by the interior of the elastic body and the bent portion form an L-shape embedded inside the elastic body.

5. The front pillar structure according to claim 1, wherein the surface covering portion is formed substantially in a U-shape that is open towards the vehicle cabin outer side in a planar cross-sectional view.

6. The front pillar structure according to claim 5, wherein an outer surface of the elastic body has a U-shape corresponding to the U-shape of the surface covering portion.

7. The front pillar structure according to claim 1, wherein a notch is formed in the elastic body, and the vehicle cabin inner-side flange portion of at least one of the first component or the second component is inserted into the notch portion.

8. The front pillar structure according to claim 1, wherein
the closed cross-sectional configuration of the pillar frame component comprises a closed cross-sectional shape,
the vehicle cabin outer-side flange portions of the first and second components are overlaid and joined together at a first location outside the closed cross-sectional shape, and
the vehicle cabin inner-side flange portions of the first and second components are overlaid and joined together at a second location outside the closed cross-sectional shape.

9. The front pillar structure according to claim 1, wherein
the vehicle cabin outer-side flange portions of the first and second components are overlaid and welded together, and
the vehicle cabin inner-side flange portions of the first and second components are overlaid and welded together.

10. The front pillar structure according to claim 1, wherein the surface covering portion covers, without contacting, the vehicle cabin inner-side flange portions and the vehicle cabin outer-side flange portions.

11. The front pillar structure according to claim 1, wherein
the surface covering portion has an inner surface that faces towards the pillar frame component, and
the elastic body is joined by an adhesive to the inner surface of the surface covering portion.

12. The front pillar structure according to claim 1, wherein distal end portions of the surface covering portion are bent towards the pillar frame component.

13. The front pillar structure according to claim 1, wherein the vehicle cabin inner-side flange portions of the first and second components are joined together outside the elastic body.

14. The front pillar structure according to claim 1, further comprising:
a U-shaped core metal inserted into a notch of the elastic body,
wherein the vehicle cabin inner-side flange portions of the first and second components are inserted into the U-shaped core metal which is inserted into the notch of the elastic body.

* * * * *